United States Patent [19]

Wirick

[11] Patent Number: 4,876,453
[45] Date of Patent: * Oct. 24, 1989

[54] METHOD AND APPARATUS FOR CALIBRATING AN IMAGING SENSOR

[75] Inventor: Michael P. Wirick, Los Angeles, Calif.

[73] Assignee: Hughes Aircraft Company, Los Angeles, Calif.

[*] Notice: The portion of the term of this patent subsequent to Oct. 10, 2006 has been disclaimed.

[21] Appl. No.: 830,788

[22] Filed: Feb. 19, 1986

[51] Int. Cl.$^4$ ............................................. H01L 31/00
[52] U.S. Cl. ................................... 250/332; 250/252.1
[58] Field of Search ..................... 250/252.1, 330, 332, 250/334, 349; 358/113

[56] References Cited

U.S. PATENT DOCUMENTS

| 3,895,182 | 7/1975 | Trilling | 358/113 |
| 4,225,883 | 9/1980 | Van Atta et al. | 250/334 |
| 4,298,887 | 11/1981 | Rode | 358/113 |
| 4,482,252 | 11/1984 | Lorenz | 250/252.1 |
| 4,590,369 | 5/1986 | Horikawa | 250/252.1 |
| 4,602,291 | 7/1986 | Temes | 358/213 |

OTHER PUBLICATIONS

U.S. Ser. No. 807,924—Filed Dec. 12, 1985.
U.S. Ser. No. 771,948—Filed Sep. 3, 1985.
U.S. Ser. No. 806,895—filed Dec. 9, 1985.
U.S. Ser. No. 933,507—filed Nov. 21, 1986.
U.S. Ser. No. 874,253—filed Jun. 13, 1986.
U.S. Ser. No. 009,153—filed Jan. 30, 1987.

Primary Examiner—Carolyn E. Fields
Attorney, Agent, or Firm—Ronald L. Taylor; W. G. Streeter; A. W. Karambelas

[57] ABSTRACT

An imaging sensor for scanning a thermal image is disclosed. The imaging sensor comprises a first set of elemental detectors operable to receive a thermal image during a first portion of the calibration cycle. A second set of elemental detector is provided which are operable to receive the image during a second portion of the calibration cycle. Means are provided for calibrating the first and second sets of elemental detectors by comparing the output of the first set of elemental detectors during the first portion of the calibration cycle with the outputs of the second set of elemental detectors during the second portion of the calibration cycle.

24 Claims, 2 Drawing Sheets

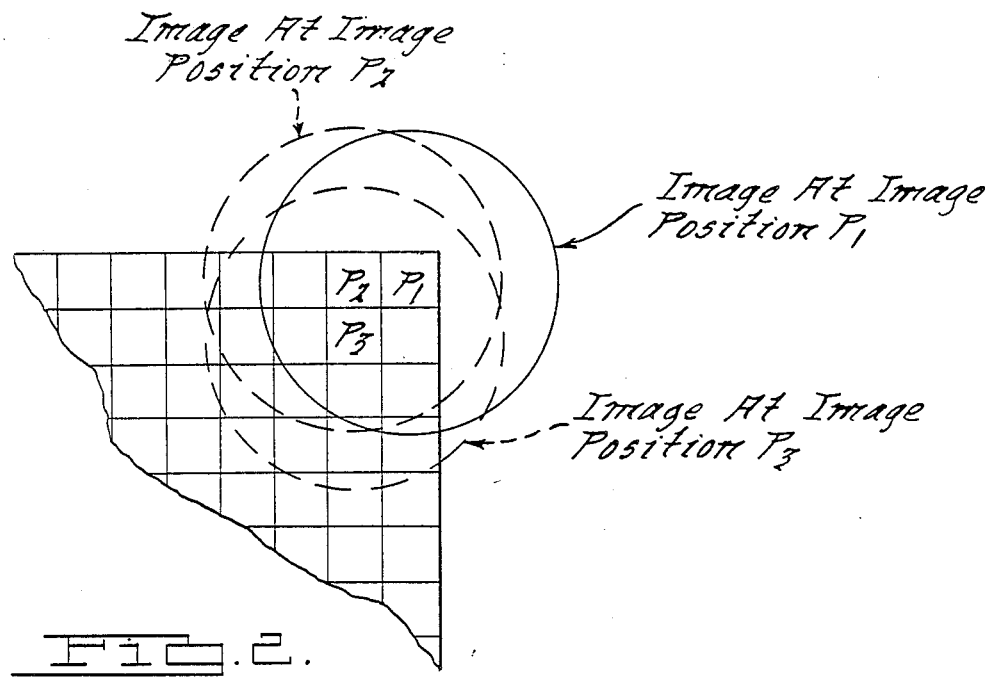

METHOD AND APPARATUS FOR CALIBRATING AN IMAGING SENSOR

BACKGROUND OF THE INVENTION

1. Field of the Invention

This invention relates to the field of infrared sensing, and more particularly to a method and apparatus for calibrating an imaging sensor.

2. Description of the Related Art

Elemental infrared detectors are often used in conjunction with missiles and night vision systems to sense the presence of electromagnetic radiation having wavelengths of 1–15 μm. To detect infrared radiation, these elemental detectors often use temperature sensitive pyroelectric crystals such as triglicine sulfate and lanthanum doped lead zirconate titanate. Such crystals exhibit spontaneous electrical polarization in response to incident infrared radiation which creates a potential drop across the electrodes of the detector. Elemental detectors may also be fabricated from materials which rely on photoconductive or photoemission properties to detect infrared radiation.

Arrays of such elemental detectors may be used to form thermal imaging systems. In real time thermal imaging systems such as forward looking infrared ("FLIR") imaging sensors, oscillating prism mirrors are used to scan radiation emitted by a source across a one-dimensional array of elemental detectors. When the elemental detectors are used in this manner, the temporal outputs of the detectors may be used to generate a two-dimensional representation of the image. In two-dimensional detector array imaging systems images such as those using staring detector arrays, the elemental detectors are used to produce free charge carriers which are then injected into a change coupled device ("CCD"). The output from the CCD is then processed by using time delay integration and parallel-to-serial scan conversion techniques.

Because each detector channel (i.e., the detector together with its coupling and amplifying electronics) in an imaging sensor often produces a different response to a given intensity of infrared radiation, it is often necessary to calibrate the detector channels so that a given infrared signal would produce approximately the same output at each channel. To provide for such calibration, it was often necessary to use an extended source emitting a uniform level of infrared radiation. When such an extended source was used, all the detectors would focus on the source during the calibration cycle while their outputs were measured. The outputs from the detector channels would then be compared so that the processing electronics could compensate for the differences in the electrical characteristics of the channels. As an alternative technique for calibrating a detector array, each of the elemental detectors were sequentially exposed to a constant intensity point source such as a scanned laser or star. After the outputs of each of the detector channels were measured, the processing electronics would determine the relative output variation of the detector channels so as to enable array calibration.

While the methods for calibrating the detector channels described above were somewhat effective, they often had several disadvantages. The alternative methods which used extended sources had to have a uniform distribution of intensity, a condition difficult to achieve in practice. Further, using constant intensity point sources for calibration was often inefficient in terms of calibration time as each individual detector element had to scan the same point source before the processing electronics could provide the necessary signal adjustment.

SUMMARY OF THE INVENTION

According to the preferred embodiment of the present invention, an image sensor for scanning a thermal image is disclosed. The imaging sensor comprises a first set of elemental detectors operable to receive a thermal image during a first portion of the calibration cycle. A second set of elemental detectors is provided which are operable to receive the image during a second portion of the calibration cycle. Means are provided for calibrating the first and second sets of elemental detectors by comparing the output of the first set of elemental detectors during the first portion of the calibration cycle with the outputs of the second set of elemental detectors during the second portion of the calibration cycle.

BRIEF DESCRIPTION OF THE DRAWINGS

The various advantages of the present invention will become apparent to one skilled in the art upon reading the following specification and by reference to the drawings in which:

FIG. 2 illustrates the sequence by which an image shifts on a detector array during the initial portions of the calibration cycle according to the present invention; and FIG. 3 illustrates the sequence by which an image shifts on a 17×17 element detector array during the calibrating cycle according to the present invention.

DESCRIPTION OF THE PREFERRED EMBODIMENT

Figure 1:
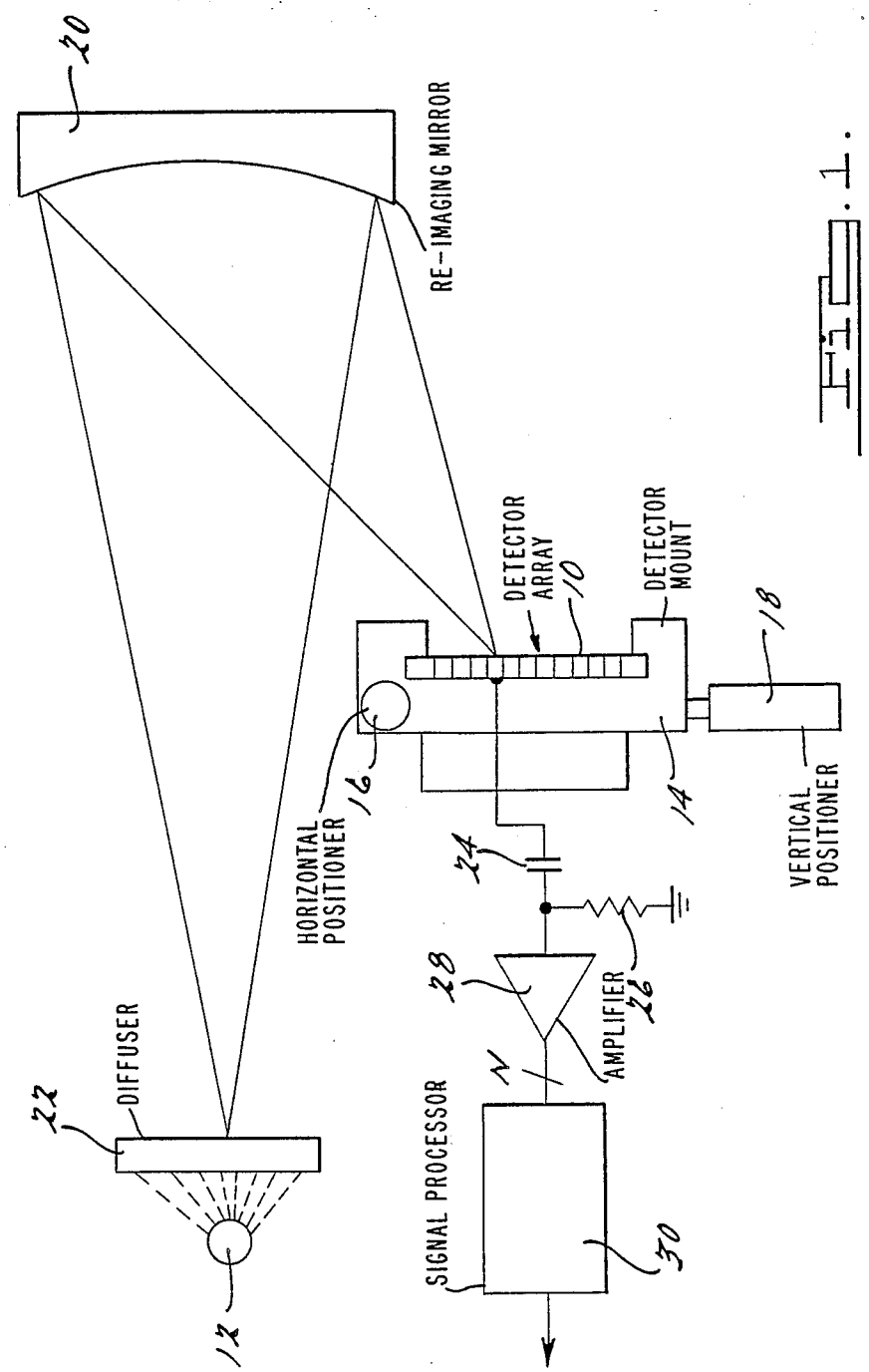
FIG. 1 is a diagrammatic side illustration of the operation of an imaging sensor.

Referring to FIG. 1, a detector array 10 is provided to detect a thermal image in the field-of-view of the array 10. The thermal image may be generated by different intensities of infrared radiation emitted by a source 12. The detector array 10 comprises a plurality of elemental detectors each able to receive a portion of the thermal energy emitted from the source 12 which lies within its field-of-view.

To position the thermal image on the elemental detectors, a detector mount 14 is provided. The detector mount 14 includes a horizontal positioner 16 and a vertical positioner 18. The horizontal positioner 16 allows the image to be horizontally located on a particular element in the detector array 10, while the vertical positioner 18 allows vertical positioning of the image on the detector array 10. By suitable adjustment of the horizontal and vertical positioners 16, 18, a predetermined portion of the image can be focused on selected elemental detectors of the detector array 10 so that the elemental detectors can be calibrated as described subsequently.

To deliver the thermal image to the array 10, a re-imaging mirror 20 is provided. The re-imaging mirror 20 as shown in FIG. 1 is used to symbolize the collecting telescope optics of a thermal imaging system and may be similar to that described in Hudson, *Infrared Systems Engineering*, John Wiley & Sons, 1969 at FIGS. 5–20, which is hereby incorporated by reference. The re-imaging mirror 20 receives the thermal image from the source 12 through a diffuser 22 and directs the image to the detector array 10. The diffuser 22 is used to optically increase the uniformity of the thermal image delivered to the re-imaging mirror 20. While the diffuser may be fabricated from a ground dielectric transmission material, other suitable materials may be used.

To process the signals received from the source 12, the output of each elemental detector element of the array 10 is connected to an A.C.-coupling circuit. For purposes of illustration, the A.C.-coupling circuit for only a particular elemental detector is shown and includes a coupling capacitor 24 and a resistor 26. The capacitor 24 and the resistor 26 are used to remove the D.C. bias potential supplied to the detectors which form the array 10. The output of the capacitor 24 is coupled to an amplifier 28 which in turn is coupled to a signal processor 30. The output from the processor 30 is used to evaluate the thermal image received by the array 10.

To compensate for differences in the electrical characteristics of the elemental detectors and their respective coupling and amplifying electronics, the horizontal positioner 16 and the vertical positioner 18 locate the center of a predetermined portion of the image at image position $P_1$ during the first portion of the calibration cycle. The predetermined portion of the image may be selected to correspond to the brightest portion image so as to obtain desirable signal-to-noise characteristics. However, it is to be understood that another portion of the image may be selected. The thermal radiation comprising the image should remain substantially constant during the calibration cycle to insure that output variation between selected detector channels corresponds to the variation in the electrical characteristics of channels. Nevertheless, the magnitude of the thermal radiation distribution may be nonuniform during the calibration cycle.

When the center of the predetermined portion of the image is located at image position $P_1$, the center of the predetermined portion is focused on the detector $D_{1,1}$. The output from the detector channel including the detector $D_{1,1}$ is then measured and stored. For purposes of illustration, the first digit in the subscript of the detector designation "D" refers to the relative horizontal position of the elemental detector in the array 10, while the second digit refers to its relative vertical position in the array 10. Accordingly, the elemental detector $D_{1,2}$ refers to the elemental detector which is in the first column and second row of the detector array shown in FIGS. 2 and 3. Further, while reference is made to the output of a particular detector, it is to be understood that the output is that of the detector channel which includes that particular detector.

During the second portion of the calibration cycle, the horizontal positioner 16 and vertical positioner 18 shift the location of the array such that the center of the predetermined portion of the image is located at image position $P_2$. The horizontal positioner 16 and the vertical positioner 18 may typically provide a displacement of 0.0002 inch. It is to be understood, however, that the magnitude of the displacement will vary according to the center-to-center separation of adjacent detectors. When the image is moved by the positioners 16, 18 in this manner, the center of the predetermined portion of the image is focused on the detector $D_{2,1}$. The output of the detector $D_{2,1}$ is then measured and compared with the output of the detector $D_{1,1}$ during the first portion of the calibration cycle. Because the same portion of the image that was focused on the detector $D_{2,1}$ during the second portion of the calibration cycle was focused on detector $D_{1,1}$ during the first portion of the calibration cycle, the differences in their outputs correspond to the variation in the electrical characteristics of their respective detector channels. The relative response of the detector $D_{2,1}$ in terms of the detector $D_{1,1}$ can therefore be mathematically related as follows:

$$\Delta_{2,1} = \frac{\xi_{2,1}(2)}{\xi_{1,1}(1)}$$

where
 $\Delta_{2,1}$ is a relative response of the detector $D_{2,1}$ with respect to the detector $D_{1,1}$;
 $\xi_{2,1}$ (2) is the output of the detector $D_{2,1}$ while the predetermined portion of the image is located at image position $P_2$; and
 $\xi_{1,1}$ (1) is the output of the detector $D_{1,1}$ while the predetermined portion of the image is located at image position $P_1$.

Therefore, the output of the detector $D_{2,1}$ may be adjusted to reflect the variation between the electrical characteristics of detectors $D_{2,1}$ and $D_{1,1}$ by dividing the output of the detector $D_{2,1}$ by its relative response $\Delta_{2,1}$.

During the third portion of the calibration cycle, the array is displaced by the horizontal positioner 16 and the vertical positioner 18 such that the predetermined portion of the image is centered at image position $P_3$. Because the image remains substantially constant between image position $P_2$ and image position $P_3$, the infrared radiation delivered to the detector $D_{2,2}$ during the third portion of the calibration cycle will be substantially the same as the thermal radiation delivered to detector $D_{2,1}$ during the second portion of the calibration cycle. Similarly, the thermal radiation delivered to the detector $D_{1,2}$ during the third portion of the calibration cycle will be substantially the same as the thermal radiation delivered to detector $D_{1,1}$ during the second portion of the calibration cycle. To calibrate the outputs of the detectors $D_{2,2}$ and $D_{1,2}$ in terms of the output of the detector $D_{1,1}$, the relative responses for the detectors $D_{2,2}$ and $D_{1,2}$ may be determined as follows:

$$\Delta_{2,2} = \frac{\xi_{2,2}(3)}{\xi_{2,1}(2)} \times \frac{\xi_{2,1}(2)}{\xi_{1,1}(1)}$$

and $$\Delta_{1,2} = \frac{\xi_{1,2}(3)}{\xi_{1,1}(2)}$$

where:
 $\Delta_{2,2}$ is the relative response of the detector $D_{2,2}$ in terms of the detector $D_{1,1}$;
 $\Delta_{1,2}$ is the relative response of th detector $D_{1,2}$ in terms of the detector $D_{1,1}$;
 $\xi_{2,2}$ (3) is the output of the detector $D_{2,2}$ during the third portion of the calibration cycle;
 $\xi_{2,1}$ (2) is the output the detector $D_{2,1}$ during the second portion of the calibration cycle;
 $\xi_{1,1}$ (1) is the output of he detector $D_{1,1}$ during the first portion of the calibration cycle;
 $\xi_{1,2}$ (3) is the output of the detector $D_{1,2}$ during the third portion of the calibration cycle; and
 $\xi_{1,1}$ (2) is the output of the detector $D_{1,1}$ during the second portion of the calibration cycle.

Accordingly, the output of the detector $D_{2,2}$ may be adjusted to reflect the variation between the electrical characteristics of the detector $9D_{2,2}$ and the detector $D_{1,1}$ by dividing the output of the detector $D_{2,2}$ by its relative response $\Delta_{2,2}$. Similarly, the output of the detector $D_{1,2}$ may also be adjusted to compensate for electrical variation between the detector $D_{1,2}$ and the detector $D_{1,1}$ by dividing the output of the detector $D_{1,2}$ by its relative response $\Delta_{1,2}$. It should be noted however that other data reduction algorithms may be used. Since the same thermal radiation received by the detector $D_{2,1}$ during the second portion of the calibration cycle is received by the detector $D_{1,1}$ during the first portion of the calibration cycle, the relative response $\Delta_{2,2}$ may be written as follows:

$$\Delta_{2,2} = \frac{\xi_{2,2}(3)}{\xi_{2,1}(2)}$$

During the fourth portion of the calibration cycle, the center of the predetermined portion of the image is shifted to image position $P_4$. The output of the detectors $D_{2,3}$ and $D_{1,3}$ are then measured and their relative responses calculated according to the following equations:

$$\Delta_{2,3} = \frac{\xi_{2,3}(4)}{\xi_{2,2}(3)} \times \frac{\xi_{2,2}(3)}{\xi_{2,1}(2)} \times \frac{\xi_{2,1}(2)}{\xi_{1,1}(1)}$$

and $$\Delta_{1,3} = \frac{\xi_{1,3}(4)}{\xi_{1,2}(3)} \times \frac{\xi_{1,2}(3)}{\xi_{1,1}(2)}$$

Accordingly, the set of detectors including detectors $D_{2,3}$ and $D_{1,3}$ may be calibrated by measuring their outputs during the fourth portion of the calibration cycle, and comparing their outputs to the outputs of the set of detectors comprising $D_{2,2}$, $D_{2,1}$, $D_{1,2}$ and $D_{1,1}$ during the first, second and third portions of the calibration cycle as described above.

The relative responses of the remaining detectors in the array can be determined by sequentially locating the predetermined portion of the image at image positions $P_5$ through $P_{11}$ and making the appropriate measurements and calculations similar to those described above. By making these measurements and calculations, the variation in the electrical characteristics between detector channels such as those due to differing responsivities and gain characteristics can be reduced. It should be understood, however, that the movement of the predetermined portion of the image across the array does not necessarily have to follow the sequence described above. Rather, any suitable path may be used so long as substantially the same thermal image which is delivered to one set of elemental detectors in a particular portion of a calibration cycle is also delivered to another set of elemental detectors in an earlier portion of the calibration cycle. Further, two or more calibration cycles may be used to achieve greater accuracy in calculating the relative responses of the elemental detectors.

It should be understood that the invention was described in connection with a particular example thereof. While FIG. 3 shows the movement of a predetermined portion of the image with respect to a 17×17 array of elemental detectors, it will be understood that arrays of different sizes may also be used. Other modifications will become apparent to those skilled in the art after a study of the specification, drawings and following claims.

What is claimed is:

1. An imaging sensor for scanning a thermal image comprising:
    a first set of elemental detectors operable to receive a portion of said thermal image during a first portion of a calibration cycle;
    a second set of elemental detectors operable to receive said portion of said thermal image during a second portion of said calibration cycle; and
    means for calibrating said first and second sets of elemental detectors by directly comparing the outputs of said first set of elemental detectors during said first portion of said calibration cycle with the outputs of said second set of elemental detectors during said second portion of said calibration cycle so that the relative responses between said first and second plurality of elemental detectors may be determined.

2. The imaging sensor of claim 1, wherein at least one of said elemental detectors in said first set of elemental detectors receives substantially the same thermal radiation during said first portion of said calibration cycle as at least one elemental detector in said second set of elemental detectors during the second portion of said calibration cycle.

3. The imaging sensor of claim 1, wherein said first and second sets of elemental detectors form a staring detector array.

4. The imaging sensor of claim 1, wherein said means for calibrating said first and second sets of elemental detectors includes means for sequentially displacing a predetermined portion of said thermal image with respect to said first and second sets of elemental detectors.

5. The imaging sensor of claim 4, wherein said means for sequentially displacing said predetermined portion of said thermal image includes a horizontal positioner and a vertical positioner.

6. The imaging sensor of claim 1, further including a diffuser through which said thermal image is received.

7. The imaging sensor of claim 1, further comprising a third set of elemental detectors operable to receive said portion of said thermal image during a third portion of said calibration cycle, said means for calibrating being further operable to calibrate said third set of elemental detectors by comparing the output of said third set of elemental detectors during said third portion of said calibration cycle with the output of said second set of elemental detectors during said second portion of said calibration cycle.

8. The imaging sensor of claim 7, further comprising a fourth set of elemental detectors operable to receive said portion of said thermal image during a fourth portion of said calibration cycle, said means for calibrating being further operable to calibrate said fourth set of elemental detectors by comparing the output of said fourth set of elemental detectors during said fourth portion of said calibration cycle with the output of said third set of elemental detectors during said third portion of said calibration cycle.

9. A method for calibrating a device for detecting a thermal image, said device comprising first and second sets of elemental detectors, said method comprising the steps of:
    focusing a predetermined portion of said thermal image on a first elemental detector in said first set of elemental detectors, the thermal radiation distribution of said predetermined portion of said thermal image being nonuniform;

measuring the outputs of said first set of elemental detectors;

focusing said predetermined portion of said thermal image on a second elemental detector in said second set of elemental detectors;

measuring the outputs of said second set of elemental detectors; and compensating for variations in the electrical characteristics between said first and second sets of elemental detectors by comparing the outputs of said first and second sets of elemental detectors.

10. The method of claim 9, wherein said step of compensating for variations in the electrical characteristics between said first and second sets of elemental detectors includes the step of comparing the outputs of said second set of elemental detectors when said predetermined portion of said thermal image is focused on said second elemental detector with the outputs of said first set of elemental detectors when said predetermined portion of said image is focused on said first elemental detector.

11. The method of claim 9, wherein said step of compensating for variations in the electrical characteristics between said first and second sets of elemental detectors includes the step of compensating for differences in the responsivities between said elemental detectors.

12. The method of claim 9, wherein said first and second sets of elemental detectors form a staring detector array.

13. The method of claim 9, wherein said thermal image remains substantially constant from when the outputs of said first set of detectors are measured to when the outputs of said second set of detectors are measured.

14. The method of claim 9, wherein said step of compensating for variations in the electrical characteristics between said first and second sets of elemental detectors includes the step of compensating for differences between the gains of the amplifiers associated with each of said elemental detectors.

15. The method of claim 9, wherein said device further comprises a third set of elemental detectors, said method comprising additional steps of:

focusing said predetermined portion of said thermal image on a third elemental detector in said third set of elemental detectors;

measuring the output of said third set of elemental detectors; and compensating for variations in the electrical characteristics between said second and third sets of elemental detectors by comparing the outputs of said second and third sets of elemental detectors.

16. The method of claim 15, wherein said device further comprises a fourth set of elemental detectors, said method comprising the additional steps of:

focusing said predetermined portion of said thermal image on a fourth elemental detector in said fourth set of elemental detectors;

measuring the output of said fourth set of elemental detectors; and compensating for variations in the electrical characteristics between said third and fourth sets of elemental detectors by comparing the outputs of said third and fourth sets of elemental detectors.

17. A method of calibrating a staring detector array during a calibration cycle without using a thermal reference source, said staring detector array having first and second sets of elemental detectors, said method comprising the steps of:

receiving a thermal image during said calibration cycle, said thermal image having a substantially constant distribution of infrared radiation during said calibration cycle;

sequentially displacing said thermal image on said staring detector array according to a predetermined pattern during said calibration cycle; and calibrating said elemental detectors by comparing the outputs of a first set of elemental detectors during a first portion of said calibration cycle with the outputs of a second set of elemental detectors during a second portion of said calibration cycle.

18. The method of claim 17, wherein said step of receiving said thermal image includes the step of receiving said thermal image through a diffuser.

19. The method of claim 18, wherein said step of sequentially displacing said thermal image includes the step of actuating horizontal and vertical positioners to locate said thermal image on said staring detector array.

20. The method of claim 19, wherein said step of calibrating said elemental detectors includes the step of calculating the relative responses of substantially all of said elemental detectors with respect to a predetermined elemental detector in said staring detector array.

21. The method of claim 20, wherein said step of calibrating said elemental detectors permits compensation for differences in responsivities between each of said elemental detectors.

22. The method of claim 21, wherein said step of calibrating said elemental detectors permits compensation for differences in the gain characteristics of the amplifying electronics associated with each of said elemental detectors.

23. The method of claim 17, wherein said staring detector array further comprises a third set of elemental detectors, said step of calibrating said elemental detectors further comprises the step of comparing the output of said second set of elemental detectors during said second portion of said calibration cycle with the output of said third set of elemental detectors during a third portion of said calibration cycle.

24. The method of claim 23, wherein said staring detector array further comprises a fourth set of elemental detectors, said step of calibrating said elemental detectors further comprises the step of comparing the output of said third set of elemental detectors during said third portion of said calibration cycle with the output of said fourth set of elemental detectors during a fourth portion of said calibration cycle.

* * * * *